United States Patent
Giesen et al.

[11] Patent Number: 5,624,517
[45] Date of Patent: Apr. 29, 1997

[54] METHOD OF MAKING A SANITARY BASIN

[75] Inventors: Willibald Giesen; Michael Schröder, both of Dautphetal; Franz Kind, Biedenkopf, all of Germany

[73] Assignee: Roth Werke GmbH, Dautphetal, Germany

[21] Appl. No.: 305,489

[22] Filed: Sep. 13, 1994

[30] Foreign Application Priority Data

Sep. 24, 1993 [DE] Germany ............... 43 32 467.3

[51] Int. Cl.$^6$ ............... B29B 13/02; B32B 31/20
[52] U.S. Cl. ............... 156/212; 156/224; 156/242; 156/308.2; 156/309.9
[58] Field of Search ............... 156/212, 214, 156/224, 308.2, 309.9, 483, 484, 425, 581, 500; 264/255, 267, 268, 269; 4/538, 580, 584, 596, 612, 619

[56] References Cited

U.S. PATENT DOCUMENTS

| | | | |
|---|---|---|---|
| 2,328,798 | 9/1943 | Gardner | 156/212 |
| 3,654,012 | 4/1972 | Schlager | 156/212 |
| 4,124,434 | 11/1978 | Wommelsdorf et al. | 156/475 |
| 4,249,983 | 2/1981 | Fujii | 156/475 |
| 4,750,967 | 6/1988 | Kott et al. | 156/500 |
| 4,938,825 | 7/1990 | MacDonald | 156/245 |

FOREIGN PATENT DOCUMENTS

| | | |
|---|---|---|
| 0052869 | 6/1982 | European Pat. Off. . |
| 0480451A1 | 4/1992 | European Pat. Off. . |
| 1924898 | 5/1969 | Germany . |

*Primary Examiner*—Michael W. Ball
*Assistant Examiner*—Richard Crispino
*Attorney, Agent, or Firm*—Herbert Dubno

[57] ABSTRACT

A foamed plastic basin body for a sanitary basin is provided with a die in which a shell of thermoplastic foil, previously heated to a bonding temperature above the deep-drawing temperature is bonded by a deep-drawing die which serves to shape the shell.

13 Claims, 2 Drawing Sheets

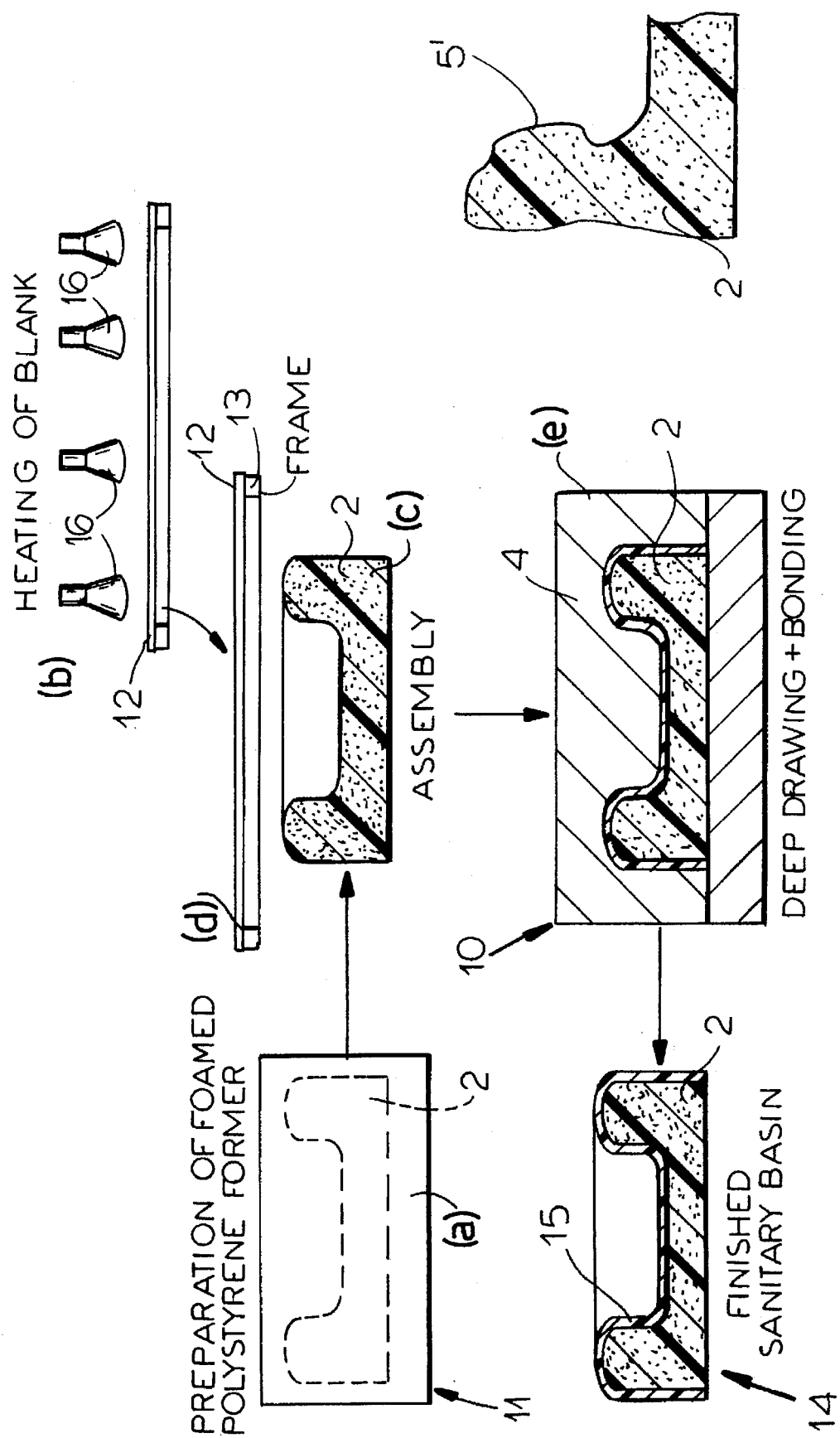

METHOD OF MAKING A SANITARY BASIN

FIELD OF THE INVENTION

Our present invention relates to a method of making a sanitary basin. More particularly the invention relates to the fabrication of a sanitary basin such as a bath tub, wash tub, shower pan or other sanitary fixture having an upwardly open cavity adapted to receive water, a body or support for the cavity and a water-impervious lining for the cavity secured to that support.

BACKGROUND OF THE INVENTION

It is known to provide a sanitary basin as a basin body or support of a foamed synthetic resin material, generally a polymer such as polystyrene, which can have a shape suitable for use of the body in a basin and a lining of a thermoplastic material which provides the water impermeability and esthetic appearance of the basin. Such basins can be used as shower pans, bath tubs, utility sink basins, sink basins for bathrooms, kitchens and other facilities. The term "basin" is used here in its broadest sense to refer to an upwardly open receptacle adapted to receive water for sanitary purposes.

In the past, the lining has been formed as a unit which can be loosely nested in the basin body or bonded therein with an adhesive. When the lining shell is only loosely nested in the basin body, the lack of a bond has proved to be a drawback which has affected the useful life of the basin in the frequently moist atmosphere in which a sanitary basin is used. Adhesive bonding is expensive. The adhesive often cannot be applied uniformly or homogeneously, and the moist atmosphere may affect the adhesive bond at least in part by water vapor penetration or diffusion into the adhesive.

OBJECTS OF THE INVENTION

It is the principal object of the present invention to provide a method of making a sanitary basin whereby these drawbacks are avoided.

Another object of this invention is to provide a simple and economical manner of forming a sanitary basin and, particularly, to bonding the basin support or body and the lining shell together so that it will become insensitive to the frequently moist atmosphere in which a sanitary basin is to be used.

Still another object of the invention is to provide an improved bond between the lining and basin body of a sanitary basin such that the bond can satisfy all mechanical and thermal requirements.

Still another object of the invention is to provide an improved sanitary basin which is free from drawbacks of earlier sanitary basins.

SUMMARY OF THE INVENTION

These objects and others which will become apparent hereinafter are attained, in accordance with the invention, with a basin body composed of a foamed synthetic resin material and a thermoplastic liner or shell which is composed of a deep drawable thermoplastic synthetic resin and wherein the previously formed basin body is used as the forming die for a deep-drawing press. In the press, the thermoplastic layer, in the form of a plate or blank, is heated to a temperature above its deep-drawing temperature, is juxtaposed with the die and is deep drawn into that die with a deep-drawing ram which also provides the pressure with which that lining material is bonded to the basin body in a direct heat and pressure bond free from adhesives or adhesion promoters.

More particularly, according to this invention, the basin body or carrier is initially fabricated, a plate-like blank of the thermoplastic material is heated to a temperature sufficient to allow it to be deep-drawn into the shape of the lining shell, the basin body is provided as the matrix or female die with bottom and side walls for the lining shell in a deep-drawing press, the heated blank on a tensioning frame juxtaposed with the heat carrier and juxtaposable with the die is brought into the press and is shaped by deep drawing with the ram against the die and the deep-drawing press ram is held against the blank and the blank against the shaping body for a period and with a pressure sufficient to bond the shaped deep-drawn blank to the body at least along the bottom and side walls.

The heating of the plate shaped blank is carried out to a temperature at least equal to the bonding temperature at which a direct bond can be established between the thermoplastic synthetic resin of the blank and the foamed synthetic resin of the basin body.

It will be understood that it is not absolutely essential for the lining blank to be shaped against the basin body as a die fully and completely. What is essential to the present invention is that the basin body be provided in the deep-drawing press in the position of the shaping die and for the deep-drawn lining shell to be bonded in the deep-drawing press with the deep-drawing ram to the basin body.

While it is preferred that the actual shaping of the blank be effected against the basin body as the actual shaping die, the shaping of the lining shell can, if desired, be performed against another die as long as the shaped lining shell is ultimately bonded to the basin body in the deep-drawing press according to the invention.

The shape of the basin body is preferably so selected that, with linear movement of the deep-drawing press ram, a press pressure is generated at least by compression of the basin body in the region of the side walls and bottom to provide the pressure necessary to bond the deep-drawn shell to the basin body. In these regions, moreover, the body can be compressed so that the reaction force generates the bonding pressure.

According to a feature of the invention, the basin body is composed of a foamed polystyrene while the blank and the lining shell are composed of a polyacrylic synthetic resin. In the preferred embodiment of the invention, a polystyrene basin body is coupled to a polyacrylic lining shell. Other materials can be used, as may be desirable and any deep-drawable thermoplastic foil can be employed as the lining shell while an alternative for the basin body can be an acrylonitrile-butadiene-styrene (ABS) terpolymer.

According to the invention, the combination of steps set forth for the method allows a reliable bond between the lining shell and the basin body to be obtained, which satisfies all requirements provided that the heating of the blank is effected to at least the temperature required to bond the lining blank to the basin body. The contact surfaces between the two can be virgin and free from bonding agents, adhesives or adhesion promoters.

The particular bonding temperature will depend upon the surfaces which are paired and as a practical matter it has been found convenient to use a temperature of 170° C. as the bonding temperature to which the blank is heated although its deep-drawing temperature is say 120° C. in the case of a polyacrylic. In any event, the heating should be homogeneous and it can be easily determined by simple empirical tests what the optimum bonding and deep-drawing temperatures are for any particular materials used.

The deep drawing speed can be selected within a wide range and is only limited by the speed at which crack formation may occur. The deep-drawing speed which is temperature-dependent should remain below that at which microscopic cracks will not arise and below the corresponding relaxation velocity.

The bonding step should, according to the invention, involve a cooling of the lining shell.

The bonding pressure should be applied for a period of 3–10 minutes, preferably about 5 minutes and should range from 5 to 10 N/cm$^2$ preferably about 7.5 N/cm$^2$ distributed uniformly over the cross section at which bonding is to be effected. Under these circumstances, adhesives or bonding agents or bond-promoting agents between the contact surfaces can be avoided altogether and the product thereby rendered more suitable for recycling.

BRIEF DESCRIPTION OF THE DRAWING

The above and other objects, features, and advantages will become more readily apparent from the following description, reference being made to the accompanying drawing in which:

FIG. 3 is a diagram illustrating steps in the process; and

FIG. 4 is a cross section showing one system for generating increased contact pressure between the lining and the basin body in the course of the method of the invention.

SPECIFIC DESCRIPTION

Figure 1:
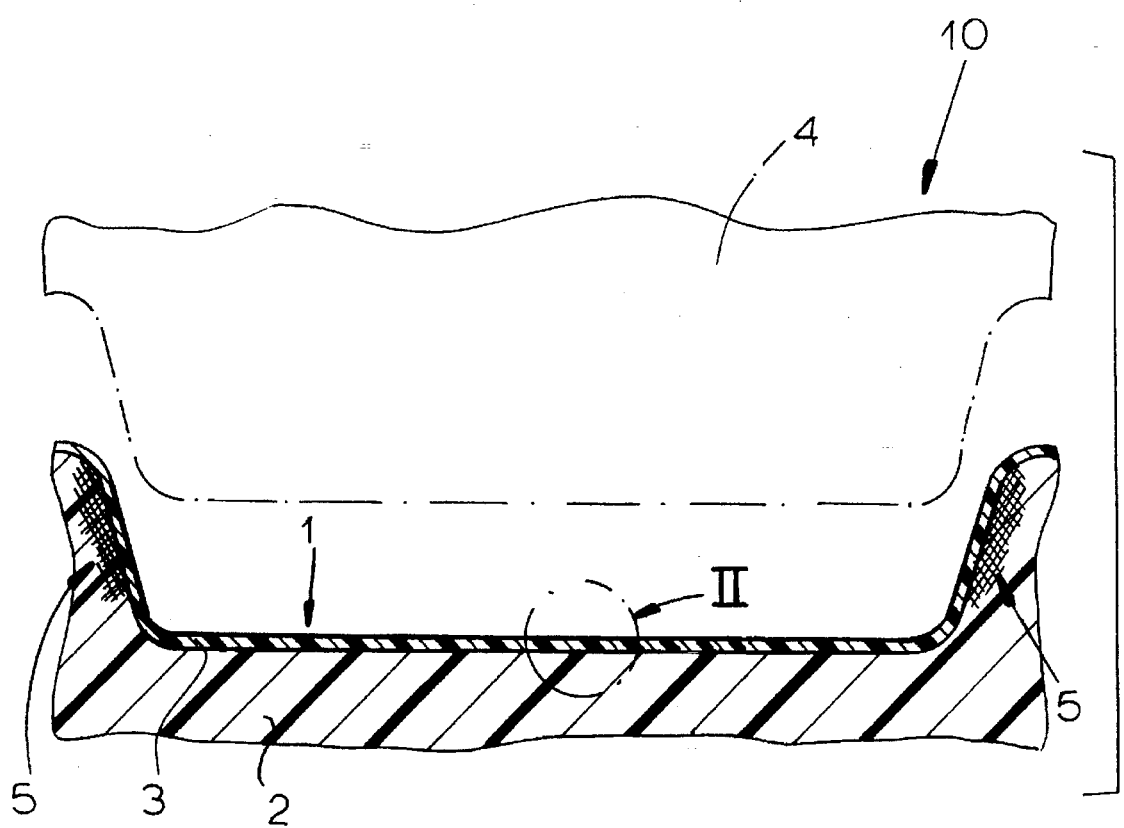
FIG. 1 is a cross sectional view in highly diagrammatic form fragmentarily illustrating the basin following the deep-drawing and bonding step.
Figure 2:
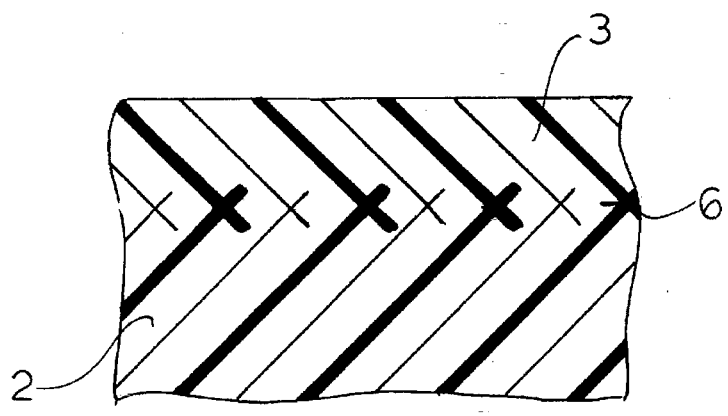
FIG. 2 is an enlarged cross sectional view of the detail II of FIG. 1.

As can be seen from FIGS. 1 and 2, the basin 1 for use in sanitary applications, e.g. as a bath tub, sink basin, shower pan, comprises as basin carrier or body 2 of foamed synthetic resin and a liner shell 3 of another material. The foamed synthetic resin for the basin body 2 preferably is a foamed polystyrene resin while the liner :shell 3 for the basin 1 is composed of polyacrylic resin such as a polymethylmethacrylate.

As is also apparent from FIG. 1, the basin body 2 can form the die for the formation of the shell 3 in a deep-drawing press represented generally at 10 and comprising a deep-drawing ram 4.

The deep-drawing operation forms the shell 3 in the previously formed basin body 2 with a bond as represented at 6 where, in effect, the two materials are fused together without the intervention of an adhesive or bond promoter and by intermelting of the two materials.

As is also apparent from FIG. 1, at least at the side walls, and preferably over the entire zone of contact of the shell 3 with the basin body 2, the basin body 2 is so shaped relative to the ram 4 that compression is effected of the basin body and the latter is densified as represented by the regions 5 to generate the requisite bonding pressure. The bond satisfies all of the requirements for the attachment of the shell to the basin body of the sanitary fixture.

The method has been illustrated in greater detail in FIG. 3. The first step (a) represents the fabrication of the basin body 2 in, for example, a steam mold case 11 commonly used to form bodies of foam polystyrene from polystyrene beads, for example.

A plate-like blank 12 of the material designed to form the shell by deep drawing is heated at (b) uniformly to a temperature in excess of the deep-drawing temperature and at least equal to the temperature at which this material will bond to the foamed polystyrene at the pressure which can be generated in the deep-drawing press.

As shown in (c), the foamed basin body 2 is provided as a die for a deep-drawing press and as is represented at (d), the blank 12 on a tensioning frame 13 is juxtaposed with the basin body 2 and at (e) is subjected to deep drawing in the press 10 with the ram 4, the pressure being maintained for a period of say 5 minutes and at 7.5 N/cm$^2$ in the preferred case in which the polyacrylic foil has been heated to 170° C. The finished sanitary basin 14 can be removed from the deep-drawing press and comprises a shell 15 lining and bonded to the basin body 2.

While the taper of the sides of the basin body 2 can differ from the taper of the sides of the ram 4 to generate the requisite pressure at 5, if desired, additional material may be provided on the basin body as shown at 5' which can be compressed outwardly by the ram 4 to provide the densified zones of FIG. 11. The additional material is represented in FIG. 4.

The heating can be effected by any means capable of providing a homogeneous heating of the polyacrylic foil and in FIG. 3 is represented by the infrared heating lamps 16.

We claim:

1. A method of originally making a sanitary basin, comprising the steps of:
   (a) forming a basin body having an upwardly open cavity from a foam synthetic resin;
   (b) heating a deep-drawable thermally softenable plate-shaped blank of a thermoplastic synthetic resin sanitary-basin surfacing material to a deep drawing temperature;
   (c) providing said basin body as a shaping die with a bottom and side walls in a deep drawing press;
   (d) juxtaposing the heated deep-drawable thermally softenable plate-shaped blank on a tensioning frame juxtaposed with the die and pressing the blank against said bottom and side walls with a deep drawing ram to deep draw the blank complementary with said die and line said body with said surfacing material; and
   (e) holding said ram against the deep drawn blank and said blank against said body with a pressure and for a duration sufficient to bond said deep drawn blank to said body directly in an intermelting of said body and said deep drawn blank, the temperature to which said blank is heated in step (b) being at least equal to a temperature required for the bonding of said deep drawn blank to said body in step (e).

2. The method defined in claim 1 wherein said body is shaped to cooperate with said ram so that at least in regions of said side walls a press pressure is generated.

3. The method defined in claim 1 wherein said body is composed of a foamed polystyrene synthetic resin.

4. The method defined in claim 1 wherein said blank is a polyacrylic synthetic resin.

5. The method defined in claim 1 wherein said basin body is composed of a polystyrene and said blank is composed of a polyacrylic.

6. The method defined in claim 1 wherein said basin body is formed by foaming a synthetic resin material.

7. The method defined in claim 1 wherein in step (e) said deep-drawn blank is cooled.

8. The method defined in claim 1 wherein said duration is from 3 to 10 minutes.

9. The method defined in claim 8 wherein said duration is about 5 minutes.

10. The method defined in claim 9 wherein said pressure is about 7.5 N/cm$^2$.

11. The method defined in claim 1 wherein said pressure is in a range of 5 to 10 N/cm$^2$.

12. The method defined in claim 1 wherein said basin body and said blank have adhesive-free contact surfaces juxtaposed with one another and bonded together.

13. The method defined in claim 1 wherein said basin body and said blank have contact surfaces with one another free from adhesion promoters.

* * * * *